United States Patent
Lee

(10) Patent No.: US 12,075,278 B2
(45) Date of Patent: Aug. 27, 2024

(54) TRAFFIC PROCESSING MONITORING METHOD

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 43 days.

(21) Appl. No.: 17/269,052

(22) PCT Filed: Sep. 11, 2019

(86) PCT No.: PCT/KR2019/011850
§ 371 (c)(1),
(2) Date: Feb. 17, 2021

(87) PCT Pub. No.: WO2020/055176
PCT Pub. Date: Mar. 19, 2020

(65) Prior Publication Data
US 2021/0282048 A1    Sep. 9, 2021

(30) Foreign Application Priority Data

Sep. 12, 2018  (KR) .......... 10-2018-0108833

(51) Int. Cl.
*H04W 28/02*   (2009.01)
*H04L 47/10*   (2022.01)
*H04L 47/20*   (2022.01)
*H04W 24/10*   (2009.01)

(52) U.S. Cl.
CPC ......... *H04W 28/0268* (2013.01); *H04L 47/20* (2013.01); *H04L 47/23* (2013.01); *H04W 24/10* (2013.01)

(58) Field of Classification Search
CPC . H04W 24/08; H04W 28/0268; H04W 24/10; H04L 47/20; H04L 47/23
See application file for complete search history.

(56) References Cited

U.S. PATENT DOCUMENTS

2004/0100949 A1*  5/2004  Bennett ................ H04L 43/50
                                                    370/384
2009/0185558 A1   7/2009  Yeom
2017/0317894 A1* 11/2017  Dao ................... H04L 41/5009
(Continued)

FOREIGN PATENT DOCUMENTS

WO   WO 2018/128528   7/2018

OTHER PUBLICATIONS

3GPP, TS23.501 v15.2.0, 3GPP, published on Jun. 18, 2018.
(Continued)

*Primary Examiner* — Jason E Mattis
*Assistant Examiner* — Bao G Nguyen
(74) *Attorney, Agent, or Firm* — KED & ASSOCIATES, LLP

(57) ABSTRACT

In accordance with an aspect of the present disclosure, there is provided a method of monitoring processing of traffic performed by a session management function (SMF). The method comprises, transmitting a measurement rule for a state of traffic processing to a user plane function (UPF); and receiving information on the state of the traffic processing from the UPF in response to the transmitted measurement rule.

10 Claims, 7 Drawing Sheets

(56) References Cited

U.S. PATENT DOCUMENTS

| | | | |
|---|---|---|---|
| 2018/0234876 A1 | 8/2018 | Jheng et al. | |
| 2018/0262924 A1* | 9/2018 | Dao | H04W 24/02 |
| 2019/0274113 A1* | 9/2019 | Jiang | G01S 1/042 |
| 2019/0289616 A1* | 9/2019 | Hampel | H04W 72/56 |
| 2020/0084671 A1* | 3/2020 | Xu | H04W 76/15 |

OTHER PUBLICATIONS

Korean Office Action dated Jun. 1, 2021 issued in Application No. 10-2018-0108833.

International Search Report dated Dec. 20, 2019 issued in Application No. PCT/KR2019/011850.

Huawei et al. Update the QoS monitoring solution for URLLC service. S2-187957. SA WG2 Meeting #128bis. Sophia Antipolis, France. Aug. 14, 2018 See pp. 2-6; table 6.8.1.3-1; and figures 6.8.2-1, 6.8.2.2-1.

Motorola Mobility et al. Solution for QoS parameter monitoring. S2-188255. SA WG2 Meeting #128bis. Sophia Antipolis, France. Aug. 14, 2018 See pp. 1-2; and figure 6.x.2.1-1.

Huawei et al. Solution for QoS Monitoring for URLLC Services. S2-186945. SA WG2 Meeting #128. Vilnius, Lithuania. Jun. 26, 2018 See pp. 3-4.

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP Standard; Technical Report ; 3GPP TR 23.725, 3rd Generation Partnership Project (3GPP), Mobile Competence Centre ; 650, Route Des Lucioles ; F-06921 Sophia-Antipolis Cedex ; France, No. VI.0.0, Sep. 8, 2018, pp. 1-59.

Huawei et al: "Solution for QoS Monitoring for URLLC Services", 3GPP Draft; S2-187477 Was S2-187398 Was S2-186945—QOS Monitoring for URLLC Services_V6Z 3rd Generation Partnership Proctect (3GPP) , Mobile Competence Centre 650, Route Des Lucioles ; F-06921 Sophia-A vol. SA WG2, no. Vilnius, Lithuania; Jul. 2, 2018-Jul. 6, 2018.

OPPO: "New solution for KI#4 QoS Monitoring", 3GPP Draft ; S2-187842 Solution for Key Issue #4 QOS Monitoring RI, 3rd Generation Partnership Project (3GPP), Mobile Competence Centre ; 650, Route Des Lucioles ; F-06921 Sophia-Antipolis Cedex Fran vol. SA WG2, no. Sophia Antipolis, France; Aug. 20, 2018-Aug. 24, 2018, Aug. 14, 2018.

Huawei et al: OI#18 TS 23.501 : Interaction between SMF and UPF on N4 Reference Point, 3GPP Draft; S2-178097 WAS7868 PCR-0I#18 23501—Interaction Between SMF and UPF-R4.1, 3rd Generation Partnership Project (3GPP), Mobile Competence Centre ; 650, Route Des Lucioles ; F-06921 Sophia-Antip vol. SA WG2, no. Ljubljana, Slovenia; Oct. 23, 2017-Oct. 27, 2017 Oct. 30, 2017.

European Search Report dated May 20, 2022 issued in Application No. 19859972.2.

* cited by examiner

FIG.4

| UP MEASUREMENT REQUEST IDENTIFICATION (ID) VALUE | OPERATION MODE | MEASUREMENT CRITERIA/ DESCRIPTION | MEASUREMENT PLACE | MEASUREMENT METHOD | MEASUREMENT PERIOD | LATENCY VALUE THRESHOLD | THROUGHPUT VALUE THRESHOLD |
|---|---|---|---|---|---|---|---|
| 1 | Event/ Periodic/ Self(self operation) | IP Flow (srcIP,dstIP,srcPort, dstPort,protocol) | Module A to Module C | Timestamp in packet | 30 s | 0.1ms | - |

FIG.6

| Event/ALARM CODE (TYPE) | MEASUREMENT CRITERIA/ DESCRIPTION | MEASUREMENT PLACE | MEASUREMENT METHOD | MEASUREMENT PERIOD | Latency value (SECONDARY VALUE) | Throughput value (SECONDARY VALUE) |
|---|---|---|---|---|---|---|
| A-1 (QoS EXCESS) | BI-DIRECTION IP Flow (srcIP,dstIP,srcPort, protocol) | RAN Side (N3 I/F) | Timestamp in packet | 30 s | 0.21 ms (min=0.18,max=0.29, quartile,std,var,ETC.) | 12 Mbps (min=11,max=19, quartile,std,var,ETC.) |
| B-6 (QoS FINE) | BI-DIRECTION IP Flow (srcIP,dstIP,srcPort, protocol) | DN Side (N6 I/F) | Timestamp in packet | 20 s | 0.12 ms (min=0.05,max=0.14, quartile,std,var,ETC.) | 29 Mbps (min=26,max=31, quartile,std,var,ETC.) |
| B-4 (QoS FINE) | BI-DIRECTION IP Flow (srcIP,dstIP,srcPort, protocol) | Module C (QER) | Timestamp in SYSTEM | 15 s | 0.21 ms (min=0.01,max=0.02, quartile,std,var,ETC.) | 124 Mbps (min=120,max=129ms, quartile,std,var,ETC.) |

TRAFFIC PROCESSING MONITORING METHOD

CROSS-REFERENCE TO RELATED APPLICATION

This application is a U.S. National Stage Application under 35 U.S.C. § 371 of PCT Application No. PCT/KR2019/011850, filed on Sep. 11, 2019, which claims priority to Korean Patent Application No. 10-2018-0108833, filed on Sep. 12, 2018. The entire contents of the application on which the priority is based are incorporated herein by reference.

TECHNICAL FIELD

The present disclosure relates to a method of monitoring traffic processing.

BACKGROUND

In the LTE communication system, as a type of a communication service and requiring data rate, etc. are diversified, expansion of the LTE frequency and evolution to the 5G communication system are actively progressing.

The rapidly evolving 5G communication system not only accommodates as many user equipments as possible based on limited radio resources but also supports scenarios of enhanced mobile (eMBB), massive machine type communications (mMTC), and ultra-reliable and low latency communications (URLLC).

In the 5G communication system, the network structure to support, from end to end, the user equipments, base stations (radio access networks), cores, and servers is defined, and a network structure that separates the Control Plane for the control signaling functions and the User Plane for the data transmission/reception functions is defined by separating the control signaling functions and data transmission/reception functions performed by a single node (e.g., S-GW, P-GW, etc.) in the existing LTE (4G) communication system.

In this case, various nodes are included in the Control Plane. For example, the Access and Mobility Management Function (AMF) that controls wireless access of the user equipment, the Policy Control Function (PCF) that manages/controls policies such as user equipment information and subscription service information for each user equipment, billing, and the like, the Session Management Function (SMF) that manages/controls a session for using data services for each user equipment, and the Network Exposure Function (NEF) that performs an information sharing function with an external network are included in the Control Plane.

In addition, functions such as the User Plane Function (UPF) may be included in the User Plane.

SUMMARY

In the 5G communication system, an Ultra-Reliable and Low Latency Communication (URLLC) service (hereinafter, referred to as a 'URLLC service') may be provided to a user equipment. At this time, in order to provide the URLLC service smoothly, it may be checked whether traffic related to the URLLC service is properly processed by the UPF, and an appropriate remedial action may be taken according to the checked result. For example, if the SMF transmits an enforcement rule for the URLLC service to the UPF, it may be checked whether the UPF actually operates according to the enforcement rule, and the appropriate remedial action may be taken according to the checked result.

Accordingly, the problem to be solved by the present disclosure is to provide a technology that, when the URLLC service is provided to the user equipment in the 5G communication system, monitors whether the traffic related to the URLLC service is being properly processed by the UPF and takes the remedial action according to the monitored result.

However, the problem to be solved by the present disclosure is not limited to the above description, and another problem to be solved that is not mentioned may be clearly understood by those skilled in the art to which the present disclosure belongs from the following description.

In accordance with an aspect of the present disclosure, there is provided a method of monitoring processing of traffic performed by a session management function (SMF). The method comprises, transmitting a measurement rule for a state of traffic processing to a user plane function (UPF); and receiving information on the state of the traffic processing from the UPF in response to the transmitted measurement rule.

In accordance with another aspect of the present disclosure, there is provided a method of monitoring processing of traffic performed by a user plane function (UPF). The method comprises, receiving a measurement rule for a state of traffic processing from a session management function (SMF); measuring the state of the traffic processing based on the transmitted measurement rule; and transmitting a measurement result of the state of the traffic processing to the SMF.

According to an embodiment, whether the UPF is processing the traffic according to the enforcement rule transmitted from the SMF may be measured or monitored. Therefore, if there is a problem in the traffic processing, the SMF may consider the remedial action based on the measurement result to resolve the problem, and transmit the remedial action to the UPF so that the remedial action is performed by the UPF. In other words, it may be monitored whether the URLLC service is smoothly provided to the user equipment in the 5G communication system.

BRIEF DESCRIPTION OF THE DRAWINGS

FIG. 4 shows a diagram illustrating a measurement rule that a SMF deliveries to an UPF.

FIG. 6 shows a diagram illustrating state information of traffic measured by an UPF.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims. In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
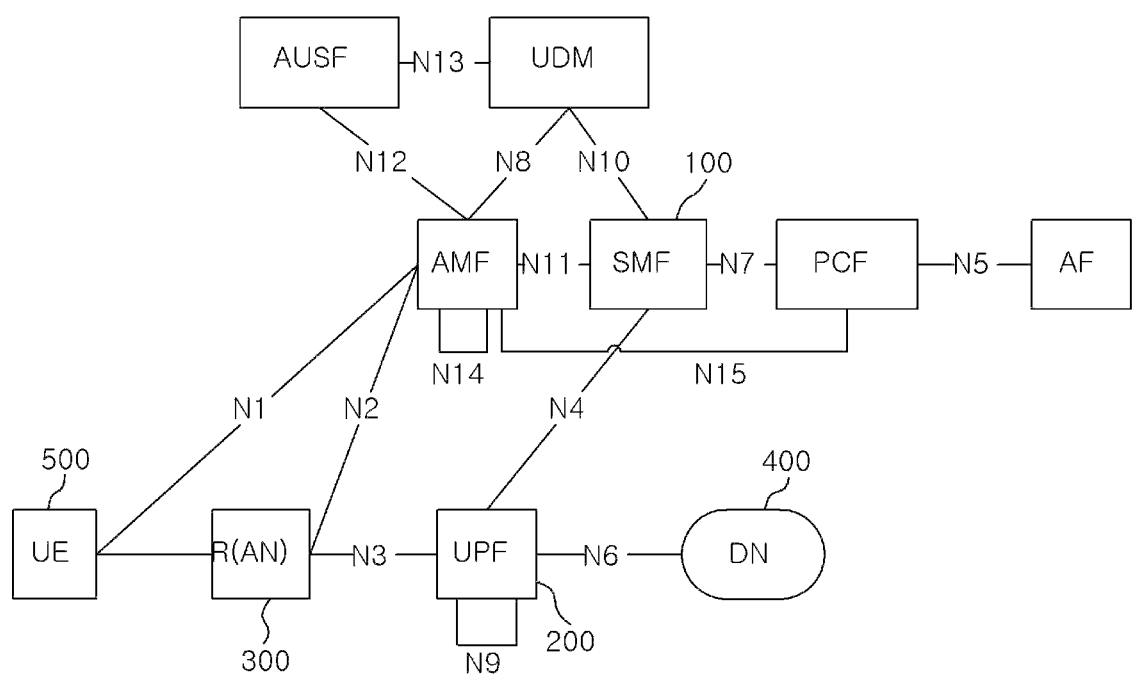
FIG. 1 shows a diagram conceptually illustrating an architecture of the 5G communication system according to an embodiment.

FIG. 1 shows a diagram conceptually illustrating an architecture 10 of the 5G communication system according to an embodiment.

The 5G communication system represented by the architecture 10 of FIG. 1 will be described. The 5G communication system is an advanced technology from the 4th generation LTE telecommunication technology. The 5G communication system is a new Radio Access Technology (RAT) and an expanded technology of Long Term Evolution (LTE) through an evolution of an existing mobile communication network structure or a clean-state structure, and supports extended LTE (eLTE), non-3GPP access, and the like.

However, because the architecture 10 illustrated in FIG. 1 is just an example, the idea of the present disclosure is not interpreted as being limited to the architecture 10 illustrated in FIG. 1 nor the 5G communication system.

The architecture 10 includes various components (for example, network functions (NF)). Hereinafter, these components will be described.

Referring to FIG. 1, an Authentication Server Function (AUSF), an (Core) Access and Mobility Management Function (AMF), a Session Management Function (SMF) 100, a Policy Control Function (PCF), an Application Function (AF), Unified Data Management (UDM), a User Plane Function (UPF) 200, an (Radio) Access Network ((R)AN) or a base station 300, a Data Network (DN) 400, and a User Equipment (UE) 500 are shown.

Among these components, the UPF 200 may be a component included in a user plane in the 5G communication system, and may be referred to as a user plane function 200 or the UPF 200 in the detailed description. Hereinafter, it will be referred to as the UPF 200.

In addition, the SMF 100 may be a component included in a control plane separated from the above-described user plane in the 5G communication system, and may be referred to as a session management function 100 or the SMF 100 in the detailed description. Hereinafter, it will be referred to as the SMF 100.

The SMF 100 and the UPF 200 each performs not only publicly known functions required in the 5G communication system, but also functions intended to be provided in an embodiment. Accordingly, hereinafter, description of the publicly known technology itself performed by each of the SMF 100 and the UPF 200 will be briefly described or skipped, and the functions intended to be provided in an embodiment will be described in more detail.

Figure 2:
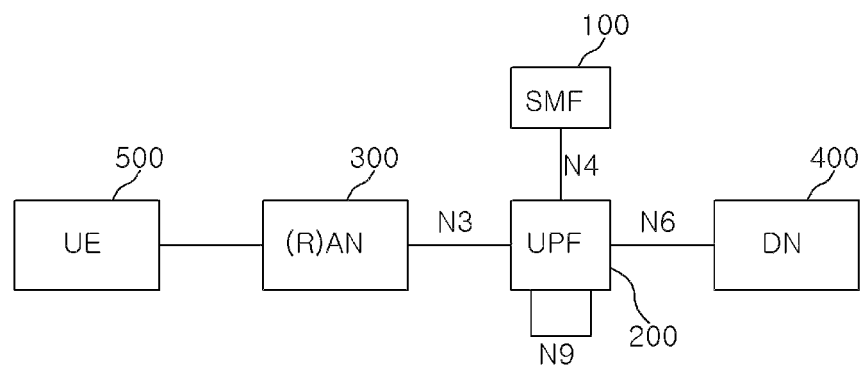
FIG. 2 shows a diagram illustrating a part of the architecture of the 5G communication system illustrated in FIG. 1.

FIG. 2 shows a diagram illustrating a part of the architecture 10 of the 5G communication system illustrated in FIG. 1. Referring to FIG. 2, the SMF 100, the UPF 200, the RAN 300 (but, hereinafter, referred to as the base station 300), the DN 400, and the UE 500 is shown.

The UPF 200 is connected to the SMF 100 through an N4 interface. In addition, the UPF 200 is connected to the base station 300 through an N3 interface, is connected to the DN 400 through an N6 interface, and is connected to another UPF connected to the SMF 100 through an N9 interface.

The UE 500 shown in FIG. 2 accesses the base station 300 and is provided with an Ultra-Reliable and Low Latency Communication (URLLC) service while using resources of the base station 300. Traffic related to the URLLC service (User Plane traffic) is processed by the UPF 200. In more detail, when the SMF 100 transmits a rule for traffic processing to the UPF 200, the UPF 200 processes the traffic related to the URLLC service or various other traffic based on the transmitted rule.

At this time, it may be measured whether the UPF 200 is processing the traffic related to the URLLC service according to the above-described rule. If the traffic related to the URLLC service is not being processed according to the rules, a problem may occur in the URLLC service, so determining a cause and a remedial action to resolve the cause may be taken.

Accordingly, according to an embodiment, the SMF 100 transmits a measurement rule for a state of traffic processing to the UPF 200. When the UPF 200 receives the measurement rule from the SMF 100, the UPF 200 measures the state of traffic processing based on the received measurement rule, and transmits a result of the measurement to the SMF 100. For example, the result of the measurement may specifically include information on which part of the UPF 200 has a problem. If the SMF 100 receives information on the state of the traffic processing from the UPF 200, and there is a problem in a specific part of the UPF 200, the SMF 100 considers a predetermined remedial action to resolve the problem of the specific part based on the received information and transmits the predetermined remedial action to the UPF 200. Then, the UPF 200 performs the predetermined remedial action received from the SMF 100.

Herein, the information on the state of the traffic processing measured by the UPF 200 may also include information on a place at which the state of the traffic processing is measured. The following is an example of a candidate group for the place where the state of the traffic processing may be measured, but the candidate group is not limited thereto.

- a first port of the UPF 200 used for input/output of the traffic with the base station 300
- a second port of the UPF 200 used for input/output of the traffic with the DN 400
- a third port of the UPF 200 used for input/output of the traffic with another UPF connected to the SMF 100
- a port of a module provided to perform a predetermined function in the UPF 200

Hereinafter, a procedure for a monitoring method or a measuring method of the traffic processing performed by the SMF 100 will be described.

Figure 3:
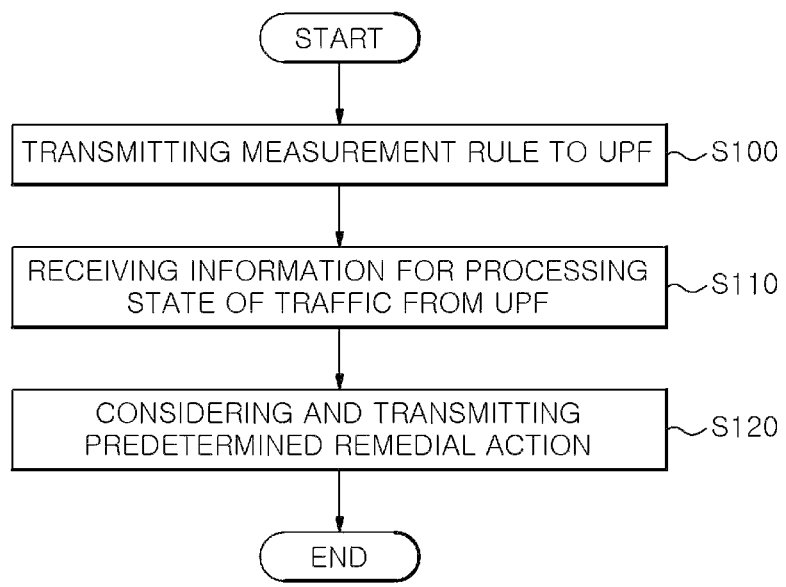
FIG. 3 shows a diagram illustrating a procedure for a monitoring method of traffic processing performed by a SMF according to an embodiment.

FIG. 3 shows a diagram illustrating a procedure for a monitoring method of traffic processing performed by the SMF 100 according to an embodiment. However, because FIG. 3 is just an example, the idea of the present disclosure is not limited to those shown in FIG. 3.

Referring to FIG. 3, the SMF 100 transmits a measurement rule for state of traffic processing to UPF 200 in a step S100. FIG. 4 shows an example of the measurement rule. Referring to FIG. 4, an identification (ID) for identifying the measurement rule (in FIG. 4, it is shown as an UP measurement request ID value), an operation mode, measurement criteria/description, a measurement place, a measurement method, a measurement period, and threshold values of latency and throughput may be included in the measurement rule.

Among these, the operation mode indicates a condition for the UPF 200 to transmit the state of the traffic processing to the SMF 100. An 'Event' mode among the operation modes is a mode in which the UPF 200 transmits the state of the traffic processing to the SMF 100 if a predetermined event occurs. A 'Periodic' mode is a mode in which the UPF 200 transmits the state of the traffic processing to the SMF 100 every predetermined period. A 'Self' mode is a mode in which the UPF 200 transmits the state of the traffic processing to the SMF 100 when a predetermined condition in the UPF 200 is satisfied.

Next, the measurement criteria/description is information used to specify traffic that is a measurement target. In other words, traffic that satisfies the measurement criteria may be the measurement target.

By using the measurement criteria, the measurement target may be specified in a traffic unit, a flow unit, or a session unit. In addition, the measurement criteria according to an embodiment may specify all traffic regarding a specific customer (e.g., a wild card '*') and if all traffic regarding the specific customer is specified, specific traffic among all traffic may be specified step by step by using the measurement criteria to be mentioned below.

The measurement criteria may include various types of items. For example, n-tuple or a field of packets such as source IP, destination IP, source port, destination port, and protocol may be included in the measurement criteria, but is not limited thereto.

Figure 5:
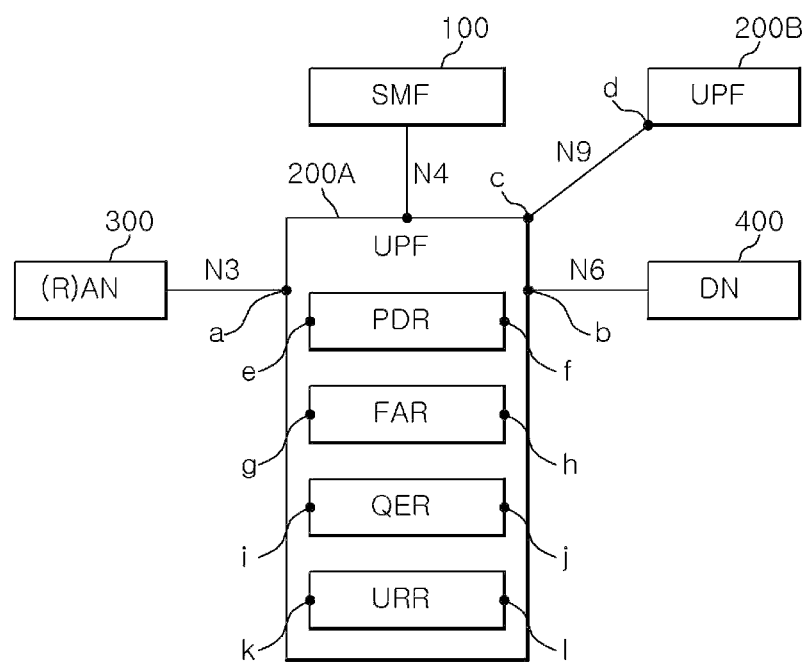
FIG. 5 shows a diagram illustrating a measurement place of traffic according to an embodiment.

Further, the measurement place is information designating a place where the state of the traffic processing is to be measured by the UPF 200. The candidate group for the measurement places were described above and the candidate group (including ports a, b, c, d, e, f, g, h, i, j, k, and l) are shown in FIG. 5.

a first port a of the UPF 200 used for input/output of the traffic with the base station 300 a second port b of the UPF 200 used for input/output of the traffic with the DN 400 a third port c of the UPF 200 used for input/output of the traffic with another UPF connected to the SMF 100 ports e, f, g, h, i, j, k, and l of modules provided to perform a predetermined function in the UPF 200

Herein, a plurality of 'modules provided to perform the predetermined function in the UPF 200' may be provided in the UPF 200. For example, the UPF 200 may include at least one of a module that performs a function according to a packet detection rule (PDR), a module that performs a function according to a forwarding action rule (FAR), and a module that performs a function according to a QoS enforcement rule (QER), and a module that performs a function according to a usage reporting rule (URR). In addition, the ports e, f, g, h, i, j, k, and l through which the traffic is input to or output from each of these modules may also be included in the candidate group of the measurement place.

A process in which the measurement is performed at the measurement place will be described in more detail in FIG. 7.

Referring again to FIG. 4, the measurement method is information indicating a method of obtaining time information indicating when the traffic processing has been performed. For example, if the measurement method is 'timestamp in packet', the measurement method is a method using a time recorded in a header of the packet, and if the measurement method is 'timestamp in system', the measurement method is a method using an atomic clock provided in the UPF 200 or the like.

The measurement period means a time period for measuring the state of the traffic processing. In addition, the threshold values of the latency and the throughput may be included in the measurement rule.

When the measurement rule described heretofore is transmitted from the SMF 100 to the UPF 200, the UPF 200 measures the state of the traffic processing based on the measurement rule, and the SMF 100 receives a measurement result in a step S110. FIG. 6 shows a diagram illustrating the measurement result that the SMF 100 received from the UPF 200. Referring to FIG. 6, the measurement result may include an operation mode indicating an occurred event, a measurement criteria indicating traffic measured as a target, a measurement place indicating a place in which the traffic was measured, a measurement method indicating a method in which time information when the measurement was performed was obtained, a measurement period indicating a time period during which the measurement has been performed, and a latency (and a secondary value) and a throughput (and a secondary value) indicating a measured value.

In other words, the measurement result includes information on 'the latency and the throughput when measuring specific traffic for a predetermined period at a specific place.' This information indicates whether the UPF 200 is processing the traffic according to the measurement rule transmitted from the SMF 100. Further, if the UPF 200 is processing differently from the measurement rule, the information indicates a place where the processing is being performed and a state at that time.

The SMF 100 considers a predetermined remedial action based on the measurement result received in the step S110 from the UPF 200, and transmits the considered remedial action to the UPF 200 in a step S120.

Specifically, for example, the SMF 100 may recognize that the measurement result received from the UPF 200 includes information showing both "event" and "emergency." In this case, the SMF 100 may consider a remedial action reducing resources of the UPF 200 allocated to a UE that is not provided with an URLLC service among UEs managed by the UPF 200. Herein, the 'reducing resources' may include, for example, at least one of dropping a packet related to the UE not provided with the URLLC service, adjusting a QoS related value of the UE not provided with the URLLC service, and adjusting a parameter related to reporting packet usage for the UE not provided with the URLLC service, but is not limited thereto.

Alternatively, the SMF 100 may shorten a period of session report request received from the UPF 200, and accordingly, a request by a UE for generating a new session may be limited than before.

Alternatively, the SMF 100 may determine, based on the measurement result, that the UPF 200 can no longer process the traffic according to the measurement rule. In this case, the SMF 100 may consider a remedial action on the UE that is provided with the URLLC service among the UEs managed by the UPF 200 to be managed by another UPF other than the UPF 200.

As described above, according to an embodiment, it may be measured or monitored whether the UPF 200 is processing the traffic according to the measurement rule received from the SMF 100, and if the processing is being performed differently from the measurement rule, a place where the processing is performed and the state of the traffic processing at that time may be measured or monitored. Therefore, if there is a problem based on the measurement result, the SMF 100 may consider a remedial action to resolve the problem, and may transmit the remedial action to the UPF 200 to make the UPF 200 to operate according to the remedial action. Accordingly, it may be monitored whether the URLLC service is smoothly provided to the UE 500 in the 5G communication system.

Hereinafter, a procedure for a monitoring method of the traffic processing performed by the UPF 200 will be described.

Figure 7:
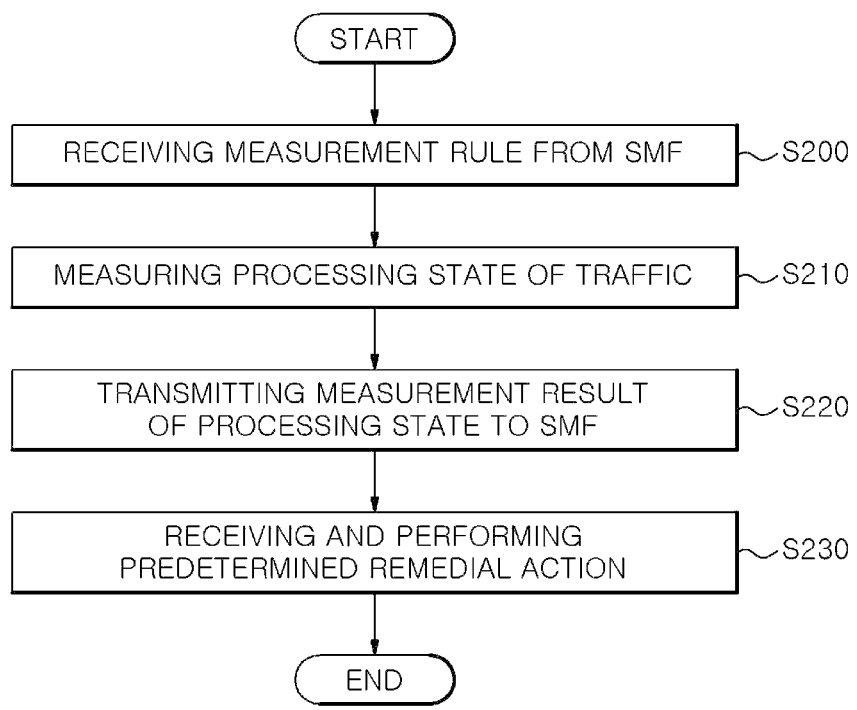
FIG. 7 shows a flowchart illustrating a procedure for a monitoring method of traffic processing performed by an UPF according to an embodiment.

FIG. 7 shows a flowchart illustrating a monitoring method of traffic processing performed by the UPF 200 according to an embodiment. However, since FIG. 7 is just an example, the idea of the present disclosure is not limited to those illustrated in FIG. 7.

Referring to FIG. 7, in a step S200, the UPF 200 receives a measurement rule from the SMF 100. The measurement rule received in the step S200 is identical to the measurement rule transmitted by the SMF 100 to the UPF 200 in the step S100 shown in FIG. 3, and because the measurement rule has already been described in FIG. 4, a description thereof will be skipped.

Thereafter, in a step S210, the UPF 200 measures a processing state of traffic related to an URLLC service based on the measurement rule received from the SMF 100 in the step S200. For example, as shown in FIG. 4, it may be assumed that the UPF 200 receives the measurement rule from the SMF 100. In this case, the UPF 200 measures a traffic state at a measurement place according to the measurement rule. When measuring, a measurement time is measured according to a method specified in a measurement method. If an operation mode is 'Event', when a predetermined event occurs, the UPF 200 transmits the measurement result to the SMF 100. When transmitting, latency and secondary values or throughput and secondary values measured at the measurement place are also transmitted.

Herein, an operation in which the UPF 200 measures the traffic state at the measurement place will be described as an example.

(Example 1) Time when the traffic is processed in a specific module may be measured. In this case, the measurement place may be designated as one of the UPF 200 or each module (a PDR, a FAR, a QER, and an URR) in the UPF 200. For example, when the UPF 200 is designated as the measurement place, a time period from when the traffic is input to the port a to when the traffic is output from the port b is measured as the latency. This is the same when either the PDR, the FAR, the QER, or the URR is designated as the measurement place.

(Example 2) Time when the traffic is processed in at least two modules may be measured. In this case, at least two modules may be designated as the measurement place. For example, if the PDR and the FAR are designated as the measurement place, a time period from when the traffic is input to the port e and then output from the port f to when the traffic is input to the port g and then output from the port h is measured as the latency.

(Example 3) Time when the traffic is transmitted between a module and another module may be measured. In this case, the measurement place may be separate UPFs 200A and 200B, and, for example, a time period from when the traffic is output from the port c to when the traffic is input to the port d is measured as the latency.

(Example 4) Transmission time of the traffic on a specific interface may be measured. For example, when the port a is designated as the measurement place, a time period from when the traffic is transmitted from the UPF 200A to the base station 300 through the port a to when the traffic is transmitted from the base station 300 to the UPF 200A through the port a again, in other words, round trip time may be measured as the latency. In this case, the traffic is transmitted and received through the N3 interface. This is the same when the port b is designated as the measurement place, and in this case, the traffic is transmitted and received through the N6 interface.

(Example 5) Examples 1 to 4 illustrate that the time period is measured based on one single traffic. Alternatively, a plurality of traffic, a flow including a plurality of traffic, or a session including a plurality of flows may be applied, as a unit, to the above-described Examples 1 to 4. For example, if the flow including a plurality of traffic is applied to the Example 1, a time period from when all traffic included in the flow is input to the port a to when all traffic is output from the port b is measured as the latency. Further, if the flow including a plurality of traffic is applied to the Example 2, a time period from when all traffic included in the flow is input to the port e and then output from the port f to when all traffic is input to the port g and then output from the port h is measured as the latency. Herein, whether a plurality of traffic is input to or output from each port may be identified based on (bidirectional) n-tuple or a field of each traffic.

Thereafter, in a step S220, the UPF 200 transmits the measurement result of the processing state measured in the step S210 to the SMF 100. The measurement result is transmitted according to the operation mode in the measurement rule received from the SMF 100 in the step S200. In other words, if the operation mode is 'Event,' the measurement result is transmitted when a predetermined event occurs, and if the operation mode is 'Periodic,' the measurement result is transmitted periodically.

After the measurement result is transmitted to the SMF 100 in the step S220, the SMF 100 may consider a predetermined remedial action based on the measurement result. In a step S230, the UPF 200 receives and performs the remedial action. The step S230 may not be performed according to an embodiment. Since the remedial action performed in the step S230 has already been described, a description thereof will be skipped.

As described above, according to an embodiment, whether the UPF 200 is processing the traffic according to the measurement rule received from the SMF 100, and if the processing is being performed differently from the measurement rule, a place where the processing is being performed and the state thereof at that time may be measured or monitored. Therefore, if there is a problem based on the measurement result, the SMF 100 may consider the remedial action to resolve the problem, and may transmit the remedial action to the UPF 200 so that the UPF 200 operates according to the remedial action.

According to an embodiment, it may be monitored whether the URLLC service is smoothly provided to the UE 500 in the 5G communication system.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A method of monitoring processing of traffic performed by a session management function (SMF), the method comprising:
transmitting a measurement rule for a state of traffic processing to a user plane function (UPF); and
receiving information on the state of the traffic processing from the UPF in response to the transmitted measurement rule,
wherein
the measurement rule identifies a measurement place at which the state of the traffic processing is measured, information used to specify traffic that is a measurement target, and a technique for obtaining a time related to the state of the traffic processing,
the measurement place includes a port of a module performing a predetermined function provided in the UPF, and
the measurement rule includes first data when the time is determined based on data included in a header of the traffic that is the measurement target and includes second data that is different from the first data when the time is obtained from a clock.

2. The method of claim 1, wherein the measurement rule further identifies at least one of
a condition for the UPF to transmit the state of the traffic processing to the SMF,
a time period during which measurement is performed, or
a type of a measurement result.

3. The method of claim 1, wherein the measurement place includes at least one of a first port of the UPF used for input/output of the traffic with a radio access network (RAN), a second port of the UPF used for input/output of the traffic with a data network (DN), or a third port of the UPF used for input/output of the traffic with another UPF connected to the SMF.

4. The method of claim 1, wherein the measurement place includes at least one of a port of the module for performing a function according to a packet detection rule (PDR), a port of the module for performing a function according to a forwarding action rule (FAR), a port of the module for performing a function according to a QoS enforcement rule (QER), or a port of the module for performing a function according to a usage reporting rule (URR).

5. The method of claim 1, wherein the traffic includes traffic related to an ultra-reliable low-latency communications (URLLC) service of a user equipment (UE) provided with the URLLC service.

6. The method of claim 1, wherein the information on the state of the traffic processing includes at least one of
information indicating whether the information on the state of the traffic processing is received periodically or in response to a predetermined event,
information on the measurement place at which the state of the traffic processing is measured,
information used for specifying the traffic that is a measurement target,
the technique for obtaining the time related to the state of the traffic processing,
a time period during which measurement is performed, or
information of a measurement result.

7. The method of claim 1, further comprising:
drawing a predetermined remedial action based on the received information on the state of the traffic processing; and
transmitting, to the UPF, the predetermined remedial action.

8. The method of claim 7, wherein the predetermined remedial action includes adjusting resources of the UPF allocated to a user equipment (UE) that is not provided with an ultra-reliable low-latency communications (URLLC) service among UEs managed by the UPF.

9. The method of claim 8, wherein adjusting the resources includes at least one of
dropping a packet including traffic of the UE that is not provided with the URLLC service,
adjusting a QoS related value of the UE that is not provided with the URLLC service, or
adjusting a parameter related to reporting of packet usage for the UE that is not provided with the URLLC service.

10. The method of claim 7, wherein the predetermined remedial action includes controlling a UE that is provided with the URLLC service among UEs managed by the UPF to be managed by another UPF, other than the UPF, connected to the SMF.

* * * * *